March 6, 1934.　　　G. A. VIEHMANN　　　1,949,946
NAVIGATING INSTRUMENT
Filed Nov. 30, 1931　　　4 Sheets-Sheet 1

INVENTOR.
GEORGE A. VIEHMANN
BY
ATTORNEYS.

March 6, 1934. G. A. VIEHMANN 1,949,946
NAVIGATING INSTRUMENT
Filed Nov. 30, 1931 4 Sheets-Sheet 2

INVENTOR.
GEORGE A. VIEHMANN
BY
ATTORNEYS.

March 6, 1934.  G. A. VIEHMANN  1,949,946
NAVIGATING INSTRUMENT
Filed Nov. 30, 1931  4 Sheets-Sheet 3
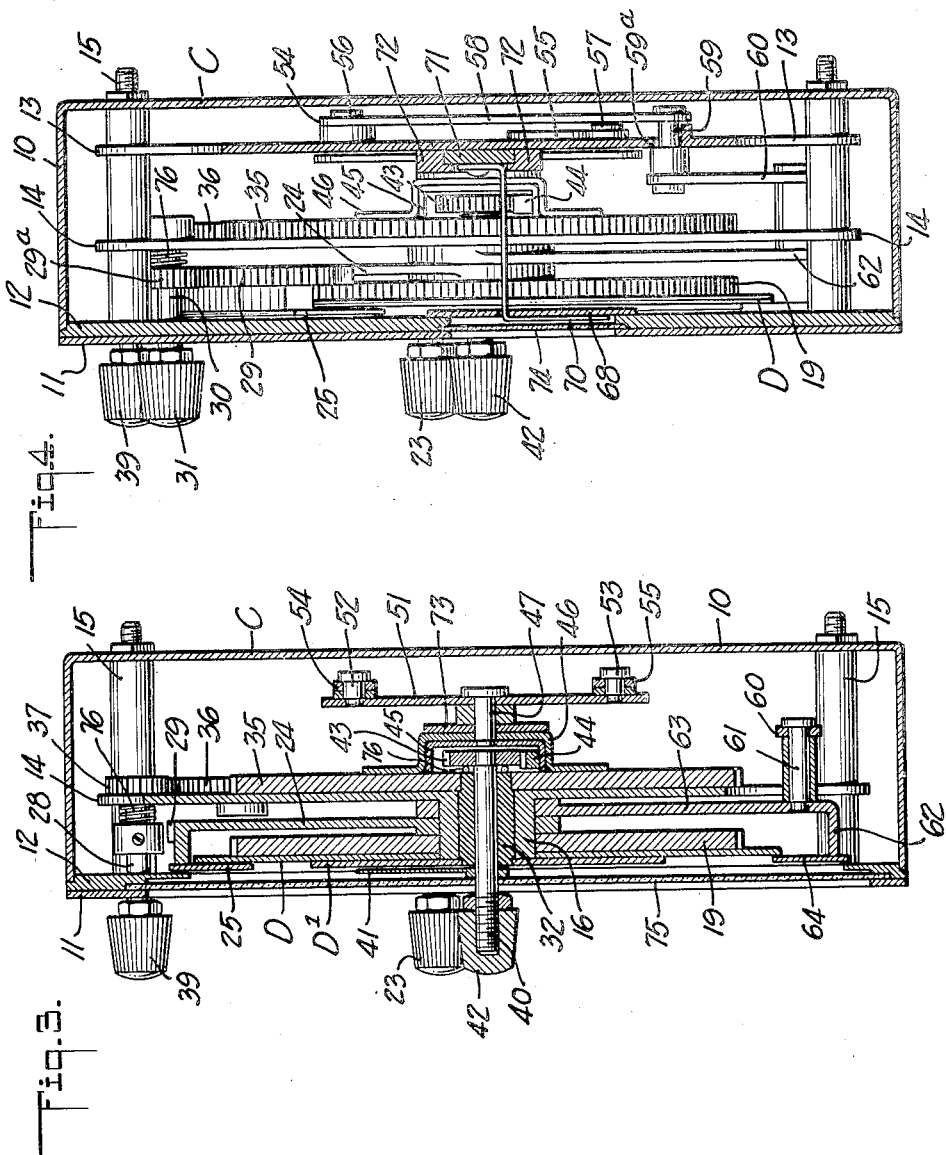
INVENTOR.
GEORGE A. VIEHMANN
BY
ATTORNEYS.

March 6, 1934.　　G. A. VIEHMANN　　1,949,946
NAVIGATING INSTRUMENT
Filed Nov. 30, 1931　　4 Sheets-Sheet 4
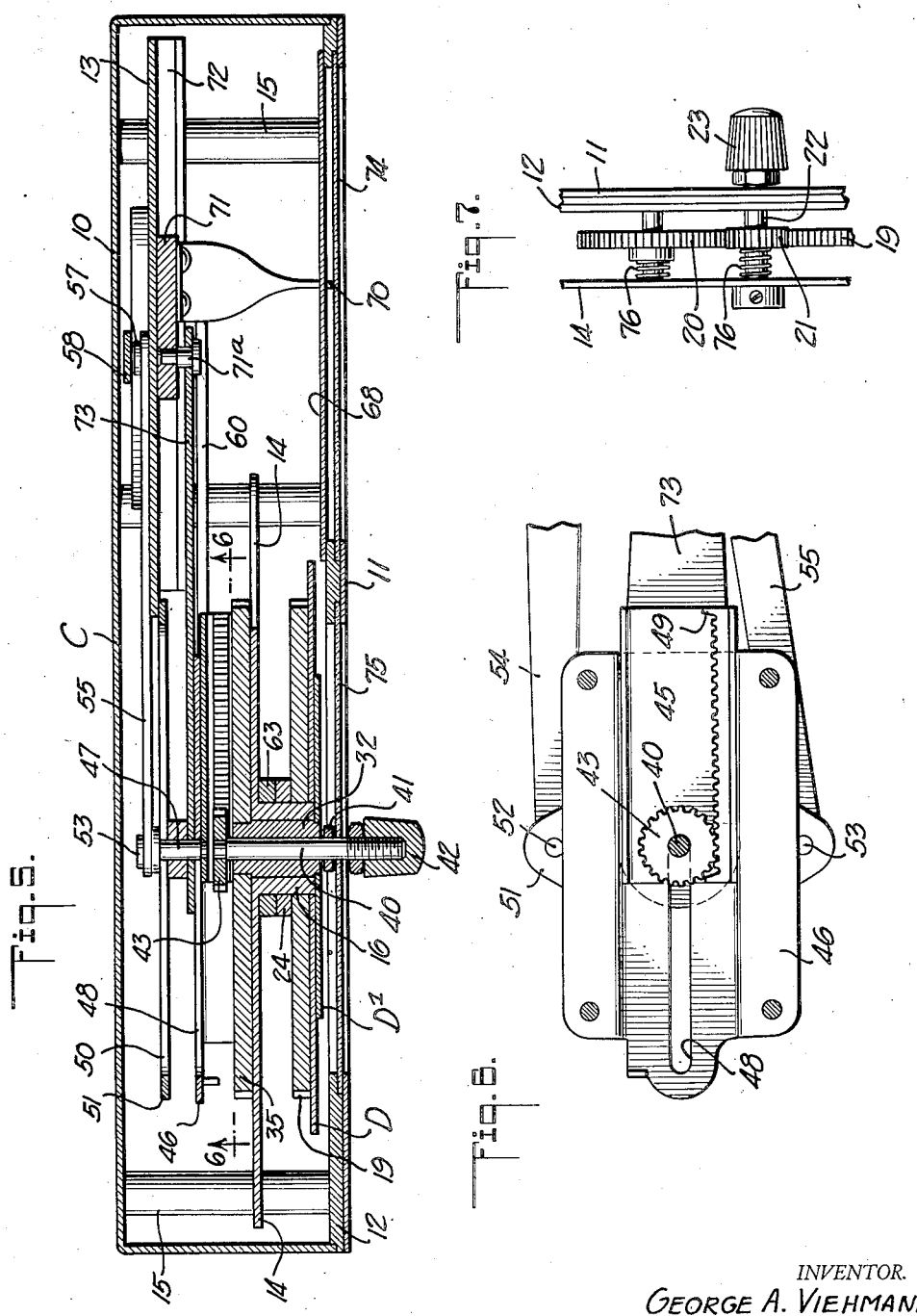
INVENTOR.
GEORGE A. VIEHMANN
BY
ATTORNEYS.

Patented Mar. 6, 1934

1,949,946

UNITED STATES PATENT OFFICE 1,949,946

NAVIGATING INSTRUMENT

George A. Viehmann, Santa Maria, Calif.

Application November 30, 1931, Serial No. 578,095

12 Claims. (Cl. 235—61)

This invention relates to and has for a purpose the provision of a navigating instrument particularly adapted, although not necessarily, for use in aerial navigation, and by which the compass course necessary to follow in order to make good a selected true course, can be ascertained with the utmost ease and dispatch and without the necessity of mathematical computation.

It is a further purpose of this invention to provide a navigating instrument which in addition to indicating a corrected compass course by compensating for drift and other compass errors such as variation, indicates the ground speed attained in accordance with a preselected air speed.

It is another purpose of this invention to provide a navigating instrument structurally characterized in a manner to render it compact and capable of being manipulated with one hand so as to leave the other hand of the pilot free to operate the "control stick" of the airplane.

Only one form of this invention will be shown and described, and the novel features thereof pointed out in claims.

Figure 1:
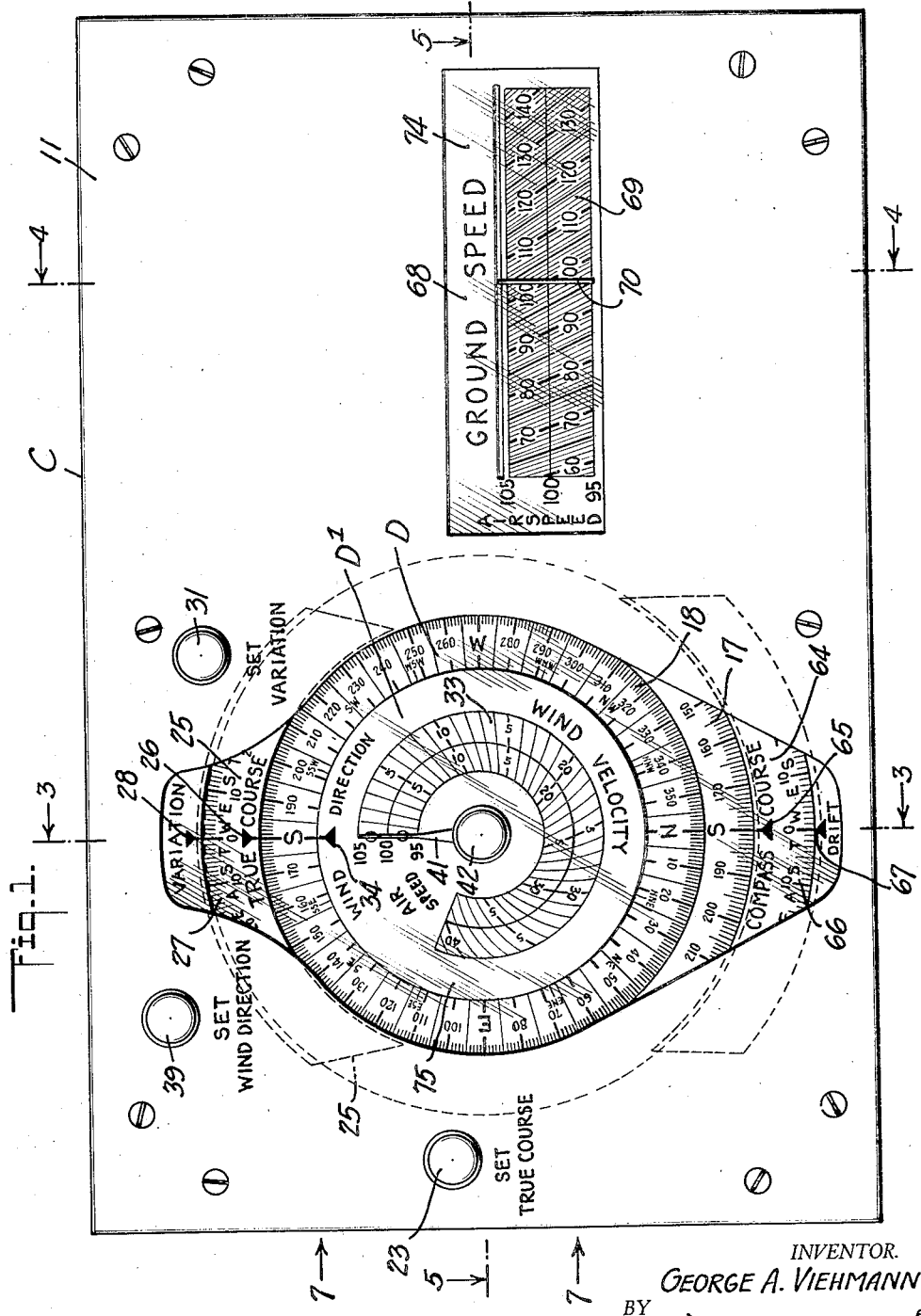
Figure 1 is a view showing in front elevation one form of navigating instrument embodying this invention.
Figure 2:
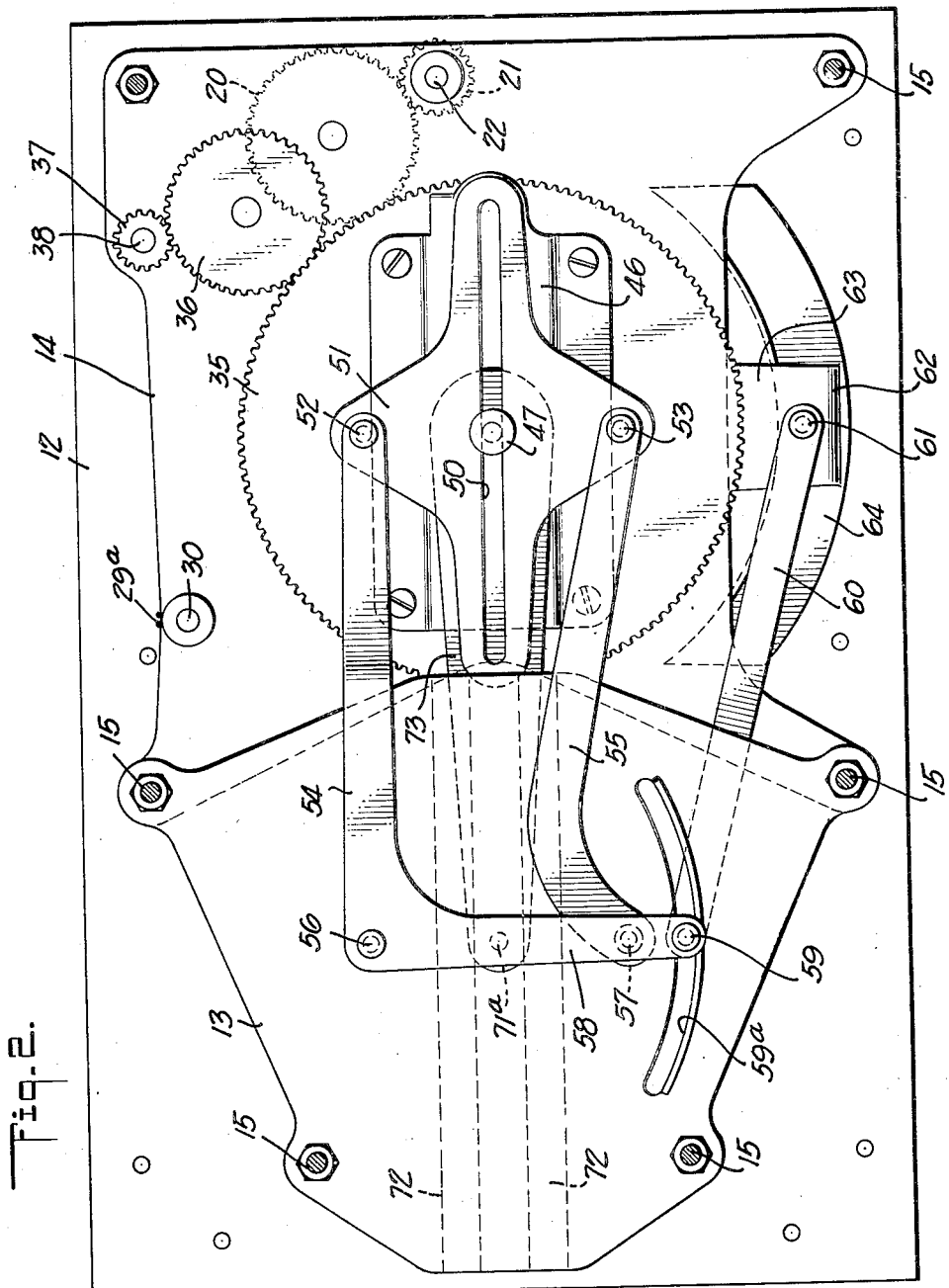
Figure 2 is a view of the instrument in rear elevation with the casing of the instrument removed.

Figures 3 and 4 are vertical transverse sectional views taken respectively on the lines 3—3 and 4—4 of Figure 1 and looking in the directions of the respective arrows;

Figure 5 is a horizontal sectional view taken on the line 5—5 of Figure 1 and looking in the direction of the arrows;

Figure 6 is a fragmentary sectional view taken on the line 6—6 of Figure 5 and looking in the direction of the arrows; and Figure 7 is a fragmentary view in end elevation looking in the direction of the arrows 7—7 in Figure 1 and with the casing of the instrument removed.

Referring specifically to the drawings in which similar reference characters designate similar parts in each of the several views, this invention in its present embodiment comprises a casing C of rectangular outline adapted to be secured to the instrument board of an airplane and including a body section 10 having an open front closed by a cover plate 11. The casing encloses the mechanism embodying this invention which comprises a front frame 12, to which the cover plate 11, is detachably secured, a rear frame 13, and an intermediate frame 14 secured together in spaced parallel relation by suitable fastening members 15 which are also utilized to secure the frame unit to the body section 10 of the casing.

Journaled on a hub 16 projecting from the intermediate frame 14 between the latter and front frame 12, is a dial D the face of which is provided with two concentric scales 17 and 18 each graduated and numbered in degrees to designate the points of the compass. The scales 17 and 18 are disposed one within the other in a radial direction and are staggered circumferentially 180° relative to each other so that "North" on one scale for example will be directly opposite "South" on the other scale. Fixed to the dial D is a gear 19 with which meshes an idler gear 20 journaled in the frames 12 and 14; and meshing with the idler gear is a pinion 21 fixed to a shaft 22 journaled in the frames 12 and 14. The shaft 22 projects through an opening in the cover plate 11, and to its outer end is fixed a knob 23 by means of which the shaft can be rotated to rotate the dial through the medium of the gears 19, 20 and 21.

Also journaled on the hub 16 by means of an arm 24 is a segmental dial in the form of a plate 25 overlying the face of the dial D and having an index 26 titled "True course" with which the graduations of the inner scale 18 on the dial, are adapted to co-act in indicating any selected true course to be made good. The plate 25 is also provided with a scale 27 graduated in degrees of east and west variation and adapted to co-act with a fixed index 28 on the frame 12 titled "Variation". The plate 25 is provided with an arcuate rack bar 29 with which meshes a gear 29ª fixed to a shaft 30 also journaled in the plates 12 and 14. The outer end of the shaft 30 projects through an opening in the cover plate 11 and has fixed thereto a knob 31 for manual operation in adjusting the plate 25 for its scale to co-act with the fixed index 28 in indicating a predetermined amount of variation.

Journaled in the hub 16 is a tubular shaft 32 to the outer end of which is fixed a second dial D¹ overlying the face of the dial D and of sufficiently smaller diameter than the latter dial to expose both of its scales 17 and 18. The dial D¹ is provided with a circular scale 33 titled "Wind velocity" and consisting of three concentric lines designated in terms of miles per hour of air speed, the inner, central and outer lines respectively being numbered 95, 100 and 105 M. P. H. constituting the usual range of cruising speed of planes for which this particular instrument is calibrated.

The scale 33 includes spirally arranged graduations connecting the three concentric lines and numbered in terms of wind velocity from 0 to 40 miles per hour.

The dial $D^1$ is also provided with an index 34 titled "Wind direction" for co-action with the graduations of the inner scale 18 in indicating any predetermined wind direction upon rotation of the dial $D^1$. Fixed to the inner end of the tubular shaft 32 so as to be fixed in effect to the dial $D^1$, is a gear 35 with which meshes an idler gear 36 journaled in the intermediate frame 13. Meshing with the idler gear 36 is a pinion 37 fixed to a shaft 38 journaled in the frames 12 and 13; and fixed to the outer end of the shaft 38 which projects through an opening in the cover plate 11, is a knob 39 for manual operation in rotating the dial $D^1$.

Journaled in the tubular shaft 32 is a stub shaft 40 the outer end of which projects through the dial $D^1$ and has fixed thereto a pointer 41 extending radially over the face of the dial for co-action with the graduations of the scale 33 at the points of intersection of the graduations with the concentric lines of the scale representing the miles per hour of air speed previously referred to. The outer extremity of the shaft 40 projects from the cover plate 11 and has fixed thereto a knob 42 for manual operation to rotate the shaft and hence the pointer 41.

The inner end of the stub shaft 40 which projects from the inner face of the gear 35, has fixed thereto a gear 43 constantly meshing with a rectilinear rack bar 44 fixed to a channel shaped plate 45 reciprocally mounted for movement radially relative to the axis of the shaft 40, in a guide member 46 fixed to the rear face of the gear 35. The plate 45 provides a support for a pivot pin 47 projecting through a longitudinal slot 48 in the guide member for rectilinear movement with the plate from a position wherein the pin is disposed co-axially of the shaft 40, to positions wherein the pin is disposed eccentrically of the shaft to a greater or less extent. One end of the slot 48 defines the co-axial position of the pin, whereas a detent 49 on the rack bar 44 limits the movement of the pin to the position of maximum eccentricity.

The pivot pin 47 also works in a slot 50 provided in a plate 51 to which is pivotally connected on opposite sides of the slot 50 at the points indicated at 52 and 53, arms 54 and 55 of equal lengths pivoted at fixed axes 56 and 57 on the rear frame 13. As the fixed axes 56 and 57 are spaced apart the same distance as the axes of the pivotal connections 52 and 53 of the arms to the plate 51, the arms will co-act to support the plate against tilting as the latter is shifted by the pivot pin 47 during such movements of the latter as will be later described.

The arm 54 is provided with a lateral extension 58 having a pin 59 on its outer extremity passing freely through an arcuate slot $59^a$ formed in the rear frame 13 concentrically of the axis 56 of the arm. To the pin 59 is pivotally connected one end of a link 60, the opposite end of which is connected at 61 to a member 62 freely mounted on the hub 16 by means of an arm 63, to the end that as the plate 51 is shifted laterally in one direction or the other by the pivot pin 47, the member 62 will be rocked about the axis of the shaft 40 in one direction or the other.

The member 62 includes a segmental dial in the form of a plate 64 supported by the arm 63 concentric with the axis of the stub shaft 40 so as to slightly overlie the face of the dial D. This plate is provided with an index 65 titled "Compass course" and adapted to co-act with the graduations of the outer scale 17 of the dial D in indicating compass courses corrected for drift and variation in the present instance. The plate 64 is also provided with an arcuate scale 66 graduated in degrees of east and west drift for co-action with a fixed index 67 on the frame 12 in indicating drift relative to a true course to be made good.

Supported in a rectangular opening in the front frame 12 is a dial 68 having a scale 69 titled "Ground speed" and extending rectilinearly in parallel relationship to the slot 50 in the plate 51. The scale 69 includes three longitudinal spaced apart lines in parallelism numbered 105, 100 and 95 to constitute miles per hour of air speed for selective use. The scale is also provided with obliquely extending graduations numbered in terms of miles per hour of air speed for co-action with a pointer 70 projecting freely through a slot in the dial 68 and fixed to a slide 71 reciprocally mounted for movement in parallelism with the slot 50 of the plate 51, by guide bars 72 fixed to the inner side of the rear frame 13. To the slide 71 is pivotally connected at $71^a$, one end of a link 73, the opposite end of which is pivotally connected to the pivot pin 47, to the end that when the pivot pin is caused to move along the length of the slot 50 in the plate 51 by rotation of the stub shaft 40, or occupies any position eccentrically of the axis of the stub shaft when the dial $D^1$ is rotated, the pointer 70 will be proportionately moved to co-act with the scale 69 in indicating the ground speed attained for a preselected air speed, allowing for the drift and variation relative to a true course to be made good.

The cover plate 11 is provided with an opening exposing the entire ground speed scale 69 and spanned by a transparent panel 74. The cover plate is also provided with a second opening spanned by a transparent panel 75 and of the shape shown in Figure 1 so as to expose the dials D and D' and the plates 25 and 64 with their co-acting fixed indices 28 and 67. The cover plate is further provided with indicia adjacent the operating knobs 23, 31 and 39 respectively stating as follows: "Set true course", "Set variation", and "Set wind direction".

Coil springs 76 surround the several shafts 22, 30, 38 and 40 and function to set up sufficient friction to prevent accidental turning of the shafts from the positions to which they are adjusted by the respective knobs.

The instrument as above described may aptly be considered as a mechanical triangle of velocities, the sides of which are reproduced in mechanical form and made adjustable as to length and angular relationships. Side No. 1 of the triangle which represents wind has for one extremity the axis of the stub shaft 40 and its other extremity the axis of the pivot pin 47. The length of this side is varied from 0 corresponding to the position of the pin 47 co-axially of the stub shaft 40, to 1.6 inches, i. e. (0 to 40 miles per hour) assuming the basic scale of the instrument to be 1 inch equaling 25 miles per hour.

Side No. 2 is represented by the link 73 which is 4 inches in length i. e. (100 miles per hour) between the axes of its pivotal connection with the pivot pin 47 and the slide 71 carrying the pointer 70 of the ground speed scale. Side No. 3 of the triangle representing ground speed has for one extremity the axis of the stub shaft, and for its other extremity the axis of the pivotal connection 71a between the link 73 and the slide 71. It is to be noted that the angle between sides Nos. 2 and 3 is the drift angle and that the angle through which moves the parallel arms 54 and 55 each 4 inches in length, is also the drift angle.

The range of air speeds is accomplished by calibrating the dials and not by changing the length of the air speed side of the triangle. Thus for 105 miles per hour, the entire scale of the triangle is changed from 4 inches equaling 100 miles per hour to 4 inches equaling 105 miles per hour.

The operation of the instrument is as follows:

It is first to be noted that with the instrument adjusted as shown in Figure 1, that as the pointer 41 indicates a zero wind velocity on the scale 33 of the dial $D^1$, that the compass course indicated, corresponds to the true course to be made good, and that the ground speed equals the air speed. In this position of the pointer 41 the pivot pin 47 is disposed co-axially with the stub shaft 40, so that rotation of the dial $D^1$ will be ineffective to cause the pin to transmit any movement to the plate 51 and adjust the plate 64 to vary the compass course, or to transmit any movement to the link 73 and to vary the ground speed.

However, in any position of the pin 47 eccentrically of the axis of the stub shaft 40, as will exist upon adjustment of the pointer 41 to indicate on the scale 33 of the dial $D^1$, any wind velocity between 0 to 40 miles per hour, rotation of the dial $D^1$ will cause a proportionate variation in the indicated compass course and ground speed.

Let it be assumed for example that it is desired to make good a true course of 180° with an existing west variation of 10°, wind from magnetic west, and a wind velocity of 25 miles per hour.

The knob 31 is first rotated to adjust the segmental dial 25 for the 10° west graduation of its variation scale 27 to become alined with the fixed variation index 28, after which the knob 23 is rotated to adjust the dial D until the 180° graduation on its inner scale 18 becomes alined with the true course index 26 of the segmental dial or plate 25.

The knob 39 is now rotated to rotate the dial $D^1$ until its wind direction index 34 is alined with the 270° or west graduation on the inner scale 18 of the dial D, which as will be noted varies the angular relationship of the path of movement of the pivot pin 47 relative to the length of the slot 50 in the plate 51, due to the fact that the guide member 46 and the pin supporting plate 45 reciprocally mounted therein, rotate bodily with the dial $D^1$.

The knob 42 is now rotated until the pointer 41 is alined with the 25 miles per hour graduation on the wind velocity scale at the intersection of this graduation with the air speed line 95, 100 or 105 M. P. H. selected as the speed at which it is desired to cruise. This adjustment of the pointer 41 will correspondingly rotate the gear 43 causing the latter to co-act with the rack bar 44 in shifting the pivot pin 47 eccentrically of the axis of the stub shaft 40, with the result that the pin will co-act with the slot 50 of the plate 51 in proportionately shifting the plate laterally. Thus through the medium of the arm 54 and link 60, the segmental dial or plate 64 will be proportionately adjusted for its compass course index 65 to become aligned with the 204° graduation of the outer scale 17 on the dial D, which 204° is the compass course to follow in order to make good at a cruising speed of 100 miles per hour, the true course of 180° compensating for the drift relative to the true course, resulting from the 25 mile an hour west wind.

In this position of adjustment of the segmental dial 64, the fixed drift index 67 will be alined with the 14° west drift graduation of the scale 66 on the dial 64, so as to indicate the amount of drift.

As the dial $D^1$ is adjusted as above described, the pivot pin 47 and the slot 50 of the plate 51 will co-act in proportionally moving the link 73 to cause the ground speed pointer 70 to indicate on the 100 miles per hour air speed line of the ground speed scale 69, that the ground speed attained for the preselected air speed is substantially 92 miles per hour due to the loss resulting from the 14° west drift.

Deviation has not been taken into account in this instrument as this error is very small, and in many instances too small to affect the compass course reading to an appreciable extent. However, should it be desired, a segmental dial similar to the dial 64 could be interposed between the latter and the scale 17 of the dial D for manual setting in the same manner as the true course dial 25.

Any given airplane has a limited range of cruising speeds, so that for this reason the range of air speeds for the instrument has been limited as otherwise complex additions would be required in order to make variable, side No. 3 of the triangle representing air speeds. To change the range of air speed for the instrument it would only be necessary to change the wind velocity and ground speed scales to conform to a different dimensional scale, without in any way altering the operative connections between the several indicating means of the instrument.

It will be manifest that the position of the dial $D^1$ circumferentially as determined by the wind direction, controls the radial direction of movement of the pin 47, and that the amount of radial movement imparted to the pin is proportionate to the wind velocity, to the end that the compass course dial 64 and the ground speed pointer will be proportionately adjusted in accordance with the amount of eccentricity of the pin and its movement circumferentially.

Furthermore it will be clear that broadly there has been provided an instrument embodying means for indicating any true course to be made good, with means adjustable to indicate wind directions and velocities, in conjunction with adjustable compass course indicating means and means adjustable to indicate ground speeds, all correlated and operatively associated in such manner that upon adjustment of the wind direction and velocity indicating means to respectively indicate a predetermined wind direction and velocity, the compass course indicating means and the ground speed indicating means will be adjusted to respectively indicate the compass course to be followed in order to compensate for drift relative to the selected true course, and the ground speed attained for a selected cruising speed, in addition to enabling variation to be compensated for and the amount of drift to be indicated.

I claim:

1. A navigating instrument comprising a rotary dial having the points of the compass thereon and adjustable to indicate any true course to be made good; a member rotatable co-axially of said dial and having an index co-acting with the latter to indicate compass courses; a second dial rotatable co-axially of the first dial and having a wind velocity scale and an index co-acting with the first dial to indicate wind directions; a pointer rotatable co-axially of said dials for co-action with the wind velocity scale in indicating wind velocities thereon; and means operatively connecting said member with the second dial and the pointer, by which adjustment of the second dial and pointer to respectively indicate a predetermined wind direction and velocity, will effect such adjustment of said member, that the index of the latter will co-act with the first dial in indicating the compass course to follow in order to compensate for drift relative to the true course indicated by the first dial.

2. A navigating instrument comprising a rotary dial having the points of the compass thereon and adjustable to indicate any true course to be made good; a member rotatable co-axially of said dial and having an index co-acting with the latter to indicate compass courses; a second dial rotatable co-axially of the first dial and having a wind velocity scale and an index co-acting with the first dial to indicate wind directions; a pointer rotatable co-axially of said dials for co-action with the wind velocity scale in indicating wind velocities thereon; means operatively connecting said member with the second dial and the pointer, by which adjustment of the second dial and pointer to respectively indicate a predetermined wind direction and velocity, will effect such adjustment of said member, that the index of the latter will co-act with the first dial in indicating the compass course to follow in order to compensate for drift relative to the true course indicated by the first dial; a ground speed scale; a pointer adjustable to traverse the scale; and means operatively connecting the ground speed pointer with the second dial and first mentioned pointer, by which the ground speed pointer will be adjusted to indicate the ground speed attained relative to a preselected air speed in accordance with the adjustment of the second dial and first mentioned pointer.

3. A navigating instrument comprising a rotary dial having the points of the compass thereon and adjustable to indicate any true course to be made good; a member rotatable co-axially of said dial and having an index co-acting with the latter to indicate compass courses; a second dial rotatable co-axially of the first dial and having a wind velocity scale and an index co-acting with the first dial to indicate wind directions; a pointer rotatable co-axially of said dials for co-action with the wind velocity scale in indicating wind velocities thereon; means operatively connecting said member with the second dial and the pointer, by which adjustment of the second dial and pointer to respectively indicate a predetermined wind direction and velocity, will effect such adjustment of said member, that the index of the latter will co-act with the first dial in indicating the compass course to follow in order to compensate for drift relative to the true course indicated by the first dial; and means co-acting with said member to indicate the existing drift in accordance with the adjustment of the second dial and pointer.

4. A navigating instrument comprising a rotary dial having the points of the compass thereon and adjustable to indicate any true course to be made good; a member rotatable co-axially of said dial and having an index co-acting with the latter to indicate compass courses; a second dial rotatable co-axially of the first dial and having a wind velocity scale and an index co-acting with the first dial to indicate wind directions; a pointer rotatable co-axially of said dials for co-action with the wind velocity scale in indicating wind velocities thereon; means mounted for movement with the second dial and having an axis adjustable by the pointer from a position co-axially of said dials to positions eccentrically thereof, and an operative connection between the axis and said member for adjusting the latter in accordance with the adjustment of the second dial and the amount of eccentricity of said axis.

5. A navigating instrument comprising a rotary dial having the points of the compass thereon and adjustable to indicate any true course to be made good; a member rotatable co-axially of said dial and having an index co-acting with the latter to indicate compass courses; a second dial rotatable co-axially of the first dial and having a wind velocity scale and an index co-acting with the first dial to indicate wind directions; a pointer rotatable co-axially of said dials for co-action with the wind velocity scale in indicating wind velocities thereon; a gear fixed to the pointer; a rack bar meshing with the gear and having a pivot pin; means for mounting the rack bar for rotation with the second dial and reciprocating movement relative to the latter by the gear to vary the location of said pin from a position co-axially of the dials to positions eccentrically thereof; and an operative connection between the pin and said member, responsive to adjustment of the second dial, to proportionately adjust said member in accordance with the amount of eccentricity of the pivot pin as determined by the position of adjustment of said pointer on the wind velocity scale.

6. A navigating instrument comprising a rotary dial having the points of the compass thereon and adjustable to indicate any true course to be made good; a member rotatable co-axially of said dial and having an index co-acting with the latter to indicate compass courses; a second dial rotatable co-axially of the first dial and having a wind velocity scale and an index co-acting with the first dial to indicate wind directions; a pointer rotatable co-axially of said dials for co-action with the wind velocity scale in indicating wind velocities thereon; a gear fixed to the pointer; a rack bar meshing with the gear and having a pivot pin; means for mounting the rack bar for rotation with the second dial and reciprocating movement relative to the latter by the gear to vary the location of said pin from a position co-axially of the dials to positions eccentrically thereof; an operative connection between the pin and said member, responsive to adjustment of the second dial, to proportionately adjust said member in accordance with the amount of eccentricity of the pivot pin as determined by the positions of adjustment of said pointer on the wind velocity scale; a ground speed scale; a pointer mounted for movement to traverse the scale; and a link connecting the pivot pin and second pointer by which a predetermined adjustment of the latter is effected in accordance with the amount of eccentricity of the pivot pin.

7. A navigating instrument comprising a rotary dial having the points of the compass thereon and adjustable to indicate any true course to be made good; a member rotatable co-axially of said dial and having an index co-acting with the latter to indicate compass courses; a second dial rotatable co-axially of the first dial and having a wind velocity scale and an index co-acting with the first dial to indicate wind directions; a pointer rotatable co-axially of said dials for co-action with the wind velocity scale in indicating wind velocities thereon; a gear fixed to the pointer; a rack bar meshing with the gear and having a pivot pin; means for mounting the rack bar for rotation with the second dial and reciprocating movement relative to the latter by the gear to vary the location of said pin from a position co-axially of the dials to positions eccentrically thereof; a plate having a slot receiving the pin, a pair of arms pivotally mounted on fixed axes and pivotally connected to the plate at opposite sides of its slot for co-action in holding the plate against tilting during movement of the plate by the pin; and a link connecting said member and one of the arms for transmitting movement of the plate by the pin to said member in accordance with the position of the pin eccentrically.

8. A navigating instrument comprising a rotary dial having scales thereon each of which designates the points of the compass; an index co-acting with one of the scales to indicate any selected true course upon rotation of the dial; a member rotatable co-axially of the dial and having an index co-acting with another of said scales to indicate compass courses thereon; a second dial rotatable co-axially of the first dial and having a wind velocity scale thereon for preselected air speeds; the second dial having an index co-acting with the first mentioned scale to indicate a predetermined wind direction in response to rotation of the second dial; a pointer rotatable co-axially of the dials and co-acting with the wind velocity scale to indicate a predetermined wind velocity in response to rotation of the pointer; and operative connections between said member and the second dial and pointer, by which adjustment of the first dial, second dial, and pointer, to respectively indicate a predetermined true course, wind direction, and wind velocity, will adjust said member to cause its index to co-act with the second mentioned scale in indicating the compass course to follow in order to compensate for drift.

9. A navigating instrument comprising a rotary dial having scales thereon each of which designates the points of the compass; an index co-acting with one of the scales to indicate any selected true course upon rotation of the dial; a member rotatable co-axially of the dial and having an index co-acting with another of said scales to indicate compass courses thereon; a second dial rotatable co-axially of the first dial and having a wind velocity scale thereon for preselected air speeds; the second dial having an index co-acting with the first mentioned scale to indicate a predetermined wind direction in response to rotation of the second dial; a pointer rotatable co-axially of the dials and co-acting with the wind velocity scale to indicate a predetermined wind velocity in response to rotation of the pointer; operative connections between said member and the second dial and pointer, by which adjustment of the first dial, second dial, and pointer, to respectively indicate a predetermined true course, wind direction, and wind velocity, will adjust said member to cause its index to co-act with the second mentioned scale in indicating the compass course to follow in order to compensate for drift; a ground speed scale; a pointer mounted to traverse the scale; and an operative connection between the ground speed pointer and the second dial and first mentioned pointer, by which the ground speed pointer will be caused to indicate the ground speed attained for the preselected air speed, upon said adjustment of the second dial and first mentioned pointer.

10. A navigating instrument comprising a rotary dial having scales thereon each of which designates the points of the compass; an index co-acting with one of the scales to indicate any selected true course upon rotation of the dial; a member rotatable co-axially of the dial and having an index co-acting with another of said scales to indicate compass courses thereon; a second dial rotatable co-axially of the first dial and having a wind velocity scale thereon for preselected air speeds; the second dial having an index co-acting with the first mentioned scale to indicate a predetermined wind direction in response to rotation of the second dial; a pointer rotatable co-axially of the dial and co-acting with the wind velocity scale to indicate a predetermined wind velocity in response to rotation of the pointer; means rotatable with and adjustable radially of the second dial and having an axis, means responsive to rotation of the pointer to adjust the last means radially and vary the location of said axis from a position co-axially of the dials to positions eccentrically thereof; and means operatively connecting said axis with said member, for adjustment of the latter in accordance with the adjustment of the second dial and the amount of eccentricity of said axis.

11. A navigating instrument comprising a rotary dial having scales thereon each of which designates the points of the compass; an index co-acting with one of the scales to indicate any selected true course upon rotation of the dial; a member rotatable co-axially of the dial and having an index co-acting with another of said scales to indicate compass courses thereon; a second dial rotatable coaxially of the first dial and having a wind velocity scale thereon for preselected air speeds; the second dial having an index coacting with the first mentioned scale to indicate a predetermined wind direction in response to rotation of the second dial; a pointer rotatable co-axially of the dials and co-acting with the wind velocity scale to indicate a predetermined wind velocity in response to rotation of the pointer; means rotatable with and adjustable radially of the second dial and having a pivot pin; a gear rotatable by the pointer and a rack bar on said means co-acting in response to rotation of the pointer, to adjust said means radially and vary the location of the pin from a position co-axially of the dials to positions eccentrically thereof; a plate having a slot in which the pin works; a pair of arms pivoted on fixed axes and pivotally connected to the plate at opposite sides of the slot for co-action in supporting the plate against tilting during movement by the pin; and a link operatively connecting one of said arms with said member to effect adjustment of the latter in accordance with the adjustment of the second dial and the amount of eccentricity of the pin.

12. A navigating instrument comprising a dial having the points of the compass thereon and adjustable to indicate any true course to be made good; an adjustable member having means coacting with the dial in indicating compass courses; a second dial having a wind velocity scale and means coacting with the first dial to indicate wind directions; means movable with the second dial and having an axis adjustable to occupy coaxial and eccentric positions with respect to the axis of the second dial; means for adjusting said axis and coacting with the wind velocity scale in indicating wind velocities thereon; and an operable connection between said axis and said member for adjusting the latter in accordance with the adjustment of the second dial and the position of adjustment of said axis.

GEORGE A. VIEHMANN.